(12) United States Patent
Jiang et al.

(10) Patent No.: US 11,144,941 B2
(45) Date of Patent: Oct. 12, 2021

(54) CARDBOT SYSTEM AND ASSOCIATED APIS

(71) Applicant: VISA INTERNATIONAL SERVICE ASSOCIATION, San Francisco, CA (US)

(72) Inventors: Chunxi Jiang, San Francisco, CA (US); Justin Yoo, San Francisco, CA (US); Myra Sandoval, San Francisco, CA (US); Margaret Szeto, San Francisco, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 67 days.

(21) Appl. No.: 16/670,423

(22) Filed: Oct. 31, 2019

(65) Prior Publication Data

US 2020/0065844 A1    Feb. 27, 2020

Related U.S. Application Data

(63) Continuation of application No. 15/473,331, filed on Mar. 29, 2017, now Pat. No. 10,546,312.

(51) Int. Cl.
*G06Q 30/00* (2012.01)
*G06Q 30/02* (2012.01)

(52) U.S. Cl.
CPC .................. *G06Q 30/0215* (2013.01)

(58) Field of Classification Search
None
See application file for complete search history.

(56) References Cited

U.S. PATENT DOCUMENTS

| | | | |
|---|---|---|---|
| 2002/0103752 A1 | 8/2002 | Berger et al. | |
| 2006/0224456 A1* | 10/2006 | Walker | G07F 17/323 705/14.1 |
| 2007/0078761 A1 | 4/2007 | Kagan et al. | |
| 2007/0155467 A1* | 7/2007 | Gardner | G07F 17/32 463/17 |
| 2008/0059375 A1* | 3/2008 | Abifaker | G06Q 20/322 705/44 |

(Continued)

OTHER PUBLICATIONS

IP.com NPL Search Strategy dated Mar. 1, 2021. (Year: 2021).*

(Continued)

*Primary Examiner* — Matthew T Sittner
(74) *Attorney, Agent, or Firm* — Loeb & Loeb, LLP

(57) ABSTRACT

A method of assisting with payment of a transaction involving a first user and a second user using a CardBot System including a CardBot API residing in a chat platform is disclosed. The method includes receiving a request for an action to be taken from the first user, receiving identifying information from the first user regarding the second user, receiving information pertaining to the action to be taken, and receiving parameters for the action to be taken. The method includes the step of performing the action to be taken based on the information pertaining to the action to be taken and parameters for the action to be taken. The performance of the action includes a calculation of an amount to be paid by the first user. The method includes the step of facilitating the sending of the amount to be paid from a first payment account to a second payment account.

13 Claims, 12 Drawing Sheets

(56) References Cited

U.S. PATENT DOCUMENTS

| | | | |
|---|---|---|---|
| 2009/0063312 A1 | 3/2009 | Hurst | |
| 2009/0276305 A1 | 11/2009 | Clopp | |
| 2012/0197754 A1 | 8/2012 | Kalin | |
| 2013/0030887 A1 | 1/2013 | Calman | |
| 2014/0274308 A1* | 9/2014 | Guinn | G07F 17/3267 463/25 |
| 2014/0351118 A1 | 11/2014 | Zhao | |
| 2015/0006376 A1* | 1/2015 | Nuthulapati | G06Q 20/321 705/41 |
| 2015/0112783 A1 | 4/2015 | Nikolaev | |
| 2015/0134428 A1* | 5/2015 | Li | G07B 15/063 705/13 |
| 2015/0234939 A1 | 8/2015 | Aharony et al. | |
| 2016/0042328 A1 | 2/2016 | Teckchandani | |
| 2016/0082348 A1* | 3/2016 | Kehoe | G06Q 50/01 463/31 |
| 2016/0104143 A1 | 4/2016 | Sugiyama | |
| 2016/0335532 A1 | 11/2016 | Sanghavi et al. | |
| 2016/0335641 A1* | 11/2016 | White | G06Q 20/40 |
| 2016/0379290 A1 | 12/2016 | Weinberger et al. | |
| 2017/0255793 A1 | 9/2017 | Caldwell | |
| 2017/0337634 A1* | 11/2017 | Ehrlich | H04W 4/029 |
| 2018/0018647 A1 | 1/2018 | Fredman et al. | |
| 2018/0167438 A1* | 6/2018 | Choi | H04L 67/22 |
| 2018/0174222 A1 | 6/2018 | Venkatakrishnan et al. | |
| 2018/0174347 A1 | 6/2018 | Chaney | |
| 2018/0181928 A1* | 6/2018 | Woo | H04W 4/02 |
| 2018/0197182 A1 | 7/2018 | Nidamanuri et al. | |
| 2018/0211233 A1 | 7/2018 | Gupta | |
| 2018/0285859 A1 | 10/2018 | Jiang et al. | |

OTHER PUBLICATIONS

IP.com Search Strategy dated Mar. 1, 2021 (Year: 2021).*
STIC EIC 3600 Search Report (Year: 2021).*
International Search Report and Written Opinion dated Jun. 20, 2018 for PCT/US18/25026, 11 pages.
Notice of Allowance dated Sep. 30, 2019 for U.S. Appl. No. 15/473,331 (pp. 1-11).
Office Action dated May 15, 2019 for U.S. Appl. No. 15/473,331 (pp. 1-16).

* cited by examiner

FIG. 2C

SAPPHIRE — 202

Hi Judy
I see you're at the Buckhorn Grill.
Isn't the food fantastic?

Help me settle the bill with a friend.

Absolutely. Who was the lucky friend? — 210

I'm splitting with Mark Jordan.

Receipt?

206

Take photo

Look up from transaction history — 208

FIG. 2D

Cancel    Upload receipts    Done

BUCKHORN GRILL

Metreon, 101 4th St #1060,
San Francisco, CA 94103

Server: Traci    9/22/2016
Table: 20    7:25 PM
Guests: 2    10062

Chicken Avocado Salad    $16
Tri-Tip Buck Sandwich    $18
Roadhouse Onion Strings    $6

Edit amounts

| | 212 |
|---|---|
| Chicken Avocado Salad | $16 |
| Tri-Tip Buck Sandwich | $18 |
| Roadhouse Onion Strings | $6 |
| Wine, 1 bottle | $14 |
| Taxes | $6 |
| Total | $60 |

CARDBOT SYSTEM AND ASSOCIATED APIS

CROSS-REFERENCE TO RELATED APPLICATIONS

This application is a continuation under 35 U.S.C. § 120 of U.S. application Ser. No. 15/473,331 filed on Mar. 29, 2017, entitled "CARDBOT SYSTEM AND ASSOCIATED APIS", the entire contents of which are incorporated herein by reference.

BACKGROUND

Today most payments are made electronically using credit and debit transaction cards or via mobile payment applications. However, credit and debit cards are static, and most mobile payment applications are not much different. As lifestyles and expectations grow more digitally sophisticated, transaction cards lose engagement and relevancy, and the loyalty of the customers who once loved them. The CardBot System and associated application program interface (API) disclosed herein seeks to bring the transaction card and the brand associated therewith to life. It delivers a user experience within any chat environment, third-party wallets, or an issuer's platform. The CardBot System cultivates and deepens engagement by offering conversation and services through a virtual assistant, simplification of group and peer payments, gamification of loyalty and rewards, and facilitation of embedded commerce.

SUMMARY

In one aspect, a computer-implemented method of assisting with payment of a transaction involving a first user and a second user using a CardBot System including a CardBot API residing in a chat platform is disclosed. The method includes the step of receiving a request for an action to be taken from the first user via a first user computing device. The first user is associated with a first payment account that is registered with the CardBot System through the CardBot API. The action to be taken includes the settling of the transaction between the first user and the second user. The method includes the step of receiving identifying information from the first user computing device regarding the second user. The second user is associated with a second payment account registered with the CardBot System through the CardBot API. The method includes the steps of receiving information pertaining to the action to be taken and receiving parameters for the action to be taken. The information includes receipt data for the transaction and the parameters include indicia of how the transaction is to be settled between the first user and the second user. The method also includes the step of performing the action to be taken. The performance of the action to be taken is based on the information pertaining to the action to be taken and parameters for the action to be taken. The performance of the action includes a calculation of an amount to be paid by the first user. The method further includes the step of facilitating the sending of the amount to be paid from the first payment account to the second payment account.

In another aspect, a system for assisting with payment of a transaction involving a first user and a second user is disclosed. The system includes a CardBot System, which includes a Cardbot API residing in a chat platform on a user computing device associated with the first user and a CardBot System server associated with the CardBot API comprising a processor, a memory, and an input/output device. The processor is physically configured to receive a request for an action to be taken from the first user via the user computing device. The first user is associated with a first payment account that is registered with the CardBot System using the CardBot API, and the action to be taken includes the settling of the transaction between the first user and the second user. The processor is physically configured to receive identifying information from the first user computing device regarding the second user. The second user is associated with a second payment account registered with the CardBot System using the CardBot API. The processor is physically configured to receive identifying information from the first user computing device regarding the second user and receive information pertaining to the action to be taken, where the information includes receipt data for the transaction, and receive parameters for the action to be taken, where the parameters include indicia of how the transaction is to be settled between the first user and the second user. The processor is physically configured to perform the action to be taken. The performance of the action to be taken is based on the information pertaining to the action to be taken and the parameters for the action to be taken and includes a calculation of an amount to be paid by the first user. The processor is also physically configured to facilitate the sending of the amount to be paid from the first payment account to the second payment account.

In further aspect, a computer-implemented method of redeeming and using a reward via a CardBot System through a CardBot API residing in a chat platform on a user computing device having an input interface and a display interface is disclosed. The method includes the steps of providing selectable suggestions to a user having a payment account registered with the CardBot System through the CardBot API regarding possible activities or items for purchase on the display interface of the user computing device and receiving the user's selection of the possible activity or item, via the input interface of the user computing device, where the selected activity or item is associated with a merchant. The method also includes the step of determining if a reward is available for the selected activity or item. If a positive determination is made, the method continues with the steps of: displaying a visual indication of the available reward for the selected activity or item on the display interface, where the available reward has an actual value that is concealed from the user; receiving a user's selection of the available reward via the input interface; displaying the actual value of the reward to the user via the display interface; receiving an indication via the input interface that the user wants to redeem the reward; determining a cost of the selected activity or item; applying the actual value of the reward to the cost of the selected activity or item; calculating an amount to be paid for the selected activity or item; facilitating the sending of payment from the user's payment account to the merchant for the amount to paid; and displaying confirmation of the payment on the display interface of the user computing device.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIG. 2A-H show an example of the CardBot System and associated APIs being used to assist with group and peer payments;

Figure 1:
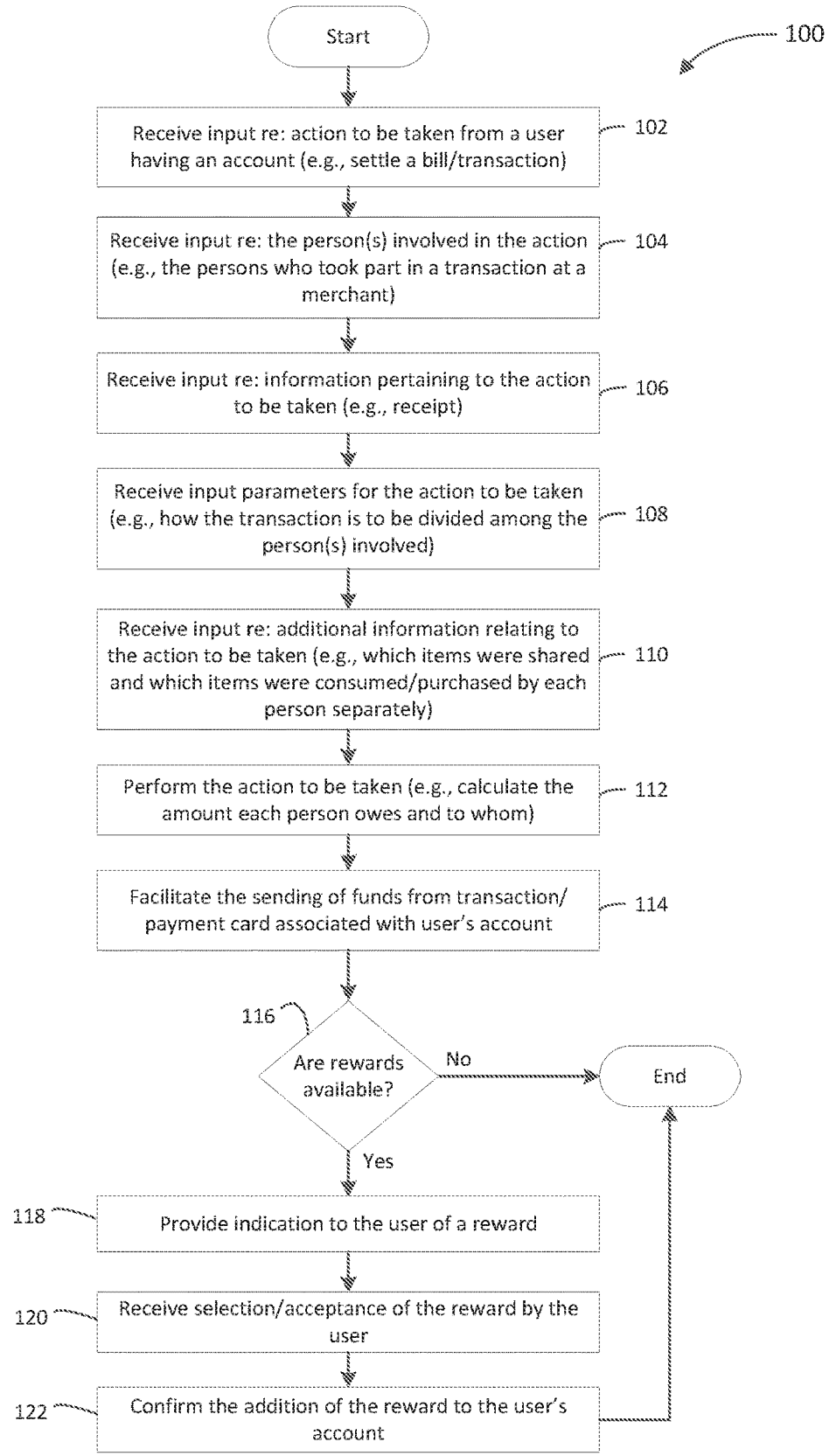
FIG. 1 illustrates an exemplary method for group and peer payments using a CardBot API.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

DETAILED DESCRIPTION

The present disclosure now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the example embodiments may take the form of an entirely hardware embodiment, an entirely software embodiment, or an embodiment combining software and hardware aspects. The following detailed description is, therefore, not to be taken in a limiting sense.

The example embodiments describe a system, method, apparatus, and computer readable media for a CardBot System and associated Cardbot APIs. The CardBot System and related APIs provides a chatbot service that resides within an existing chat platform (e.g., Facebook Messenger, WeChat, Slack, iMessage, etc.), on an e-commerce website, third-party wallets system, and/or on a payment/banking API. The CardBot System and APIs provides a real-time personalized experience to a user. The CardBot System includes a virtual assistant that interactively converses with the user and assists the user with various activities, purchases, and loyalty and rewards offerings and redemptions. By providing contextual, personalized lifestyle services, the CardBot System makes mundane tasks enjoyable and establishes an emotional connection between the user and their transaction cards.

The CardBot System and related APIs also provides for the gamification of rewards. Gamification of rewards may include the use of icons, images, and/or animation to make the earning and collection of rewards by the user a fun and interactive experience. The rewards may be associated with a "mystery" value in that the actual value of the reward is only made known when the reward becomes available and is redeemed by the user. The reward may become available upon the completion of a milestone set by the party offering the reward such as a merchant or issuer of a transaction card.

The CardBot System and related APIs may also lower customer services costs for card issuers as the system automates the customer service function. For example, the CardBot System and related APIs may deliver alert messages regarding a particular payment account and may help users manage and respond to fraud alerts. The CardBot System and related APIs may also prompt users to tell their issuers when and where they are traveling or give permission to automatically detect their location and prevent transaction declines.

The CardBot System and associated APIs may further offer a convenient, more human-like interface for users to inquire, manage, and modify content of a payment account or make decisions and take action. The CardBot System and associated APIs handle requests with intelligence and connect the dots through conversation. The CardBot System and associated APIs enable content to be accessed through the chatbot instead of predecessor user interfaces with menus, buttons, and flows. The CardBot System and associated APIs may also be embedded into different environments and may "travel with the user" as they navigate through various commerce and banking environments and are in need of assistance with their card.

At a high level, the CardBot system may be one or more servers, or even processors inside servers, that are physically configured to execute the CardBot system. The CardBot system may act as an interactive assistant that adds functionality to a variety of computing platforms, such as social network applications. The CardBot APIs may be a set of rules that data used by the CardBot System may follow to be successfully communicated back and forth to the CardBot System. As a result of the CardBot System and CardBot APIs, the technical problem of how to assist users in using and understanding benefits of a system or computing platform in an efficient manner may be addressed. Further, the use of the CardBot API may speed communication, reduce errors and increase efficiency.

FIG. 1 illustrates an embodiment of a method 100 for group and peer payments using the CardBot System and APIs. A user may register any number of user payment accounts 202 with the CardBot System through the Cardbot API. The payment accounts may be associated with one or more credit or debit cards. A user may then launch the CardBot System on a user computing device 600 through, for example, an existing chat platform such as Facebook Messenger on a user computing device 600. The user computing device 600 may be a smart phone, a laptop, desktop, or other device capable of communicating data as further discussed with respect to FIG. 6.

At block 102, the CardBot System may provide a personalized greeting 204 to the user and may provide a customized message 206. The customized message may be based on the location of the user determined by the CardBot System through the use of geolocation software, on the current date, day of the week, the time of day, user preferences, or any other variables or considerations. The customized message 206 may provide information to the user, confirm the location of the user or other information, or may present an inquiry to the user. The user may then provide a response 208. For example, the CardBot System may ask the user a question about her location or if she needs assistance with anything. The Cardbot System may receive a response from the user requesting assistance with an action to be taken 211. The action to be taken 211 may relate, for example, to a task such as splitting a bill between a group of users, payment of each user's individual portions of a bill to a merchant, payment from one user to another, or payment from one user to a merchant.

In the example shown in FIGS. 2A-H, a user, Judy, has registered a payment account associated with her "Sapphire®" credit card payment account 202 with the CardBot System. The user may be at a restaurant called the Buckhorn Grill and may need assistance settling a bill for food and beverages with a friend Mark. Upon launch, the CardBot System, may send a personalized greeting 204 (e.g., "Hi Judy") and a customized message 206 (e.g., "I see you're at the Buckhorn Grill. Isn't the food fantastic?"). The user may be provided with several preset responses 208 to the customized message 206 or the user may enter a unique response using an input interface 602 of the user computing device 600. The preset responses 208 may provide information to the CardBot system or may request the action to be taken 211 (e.g., the settling of a bill). In the example shown in FIG. 2A, the user has responded that she would like to settle the bill.

At a block 104, the CardBot System may prompt the user through customized message 206 to provide identifying information 210 of the other person(s) involved in the action to be taken 211. The person(s) must also be a registered user of the CardBot System in order for the action 211 to be performed. The user may identify the other person(s) involved in the action to be taken 211 by inputting the name of the other person(s) using the input interface 602 of the user computing device 600, selecting the person(s) from a list of contacts saved on the user computing device 600, taking a picture of the other person(s) and uploading the photograph to the CardBot System through the CardBot API, obtaining a fingerprint or other biometric information from the other person(s) involved, or locating the other person(s) through a social media website such as Facebook®.

Figure 2A:
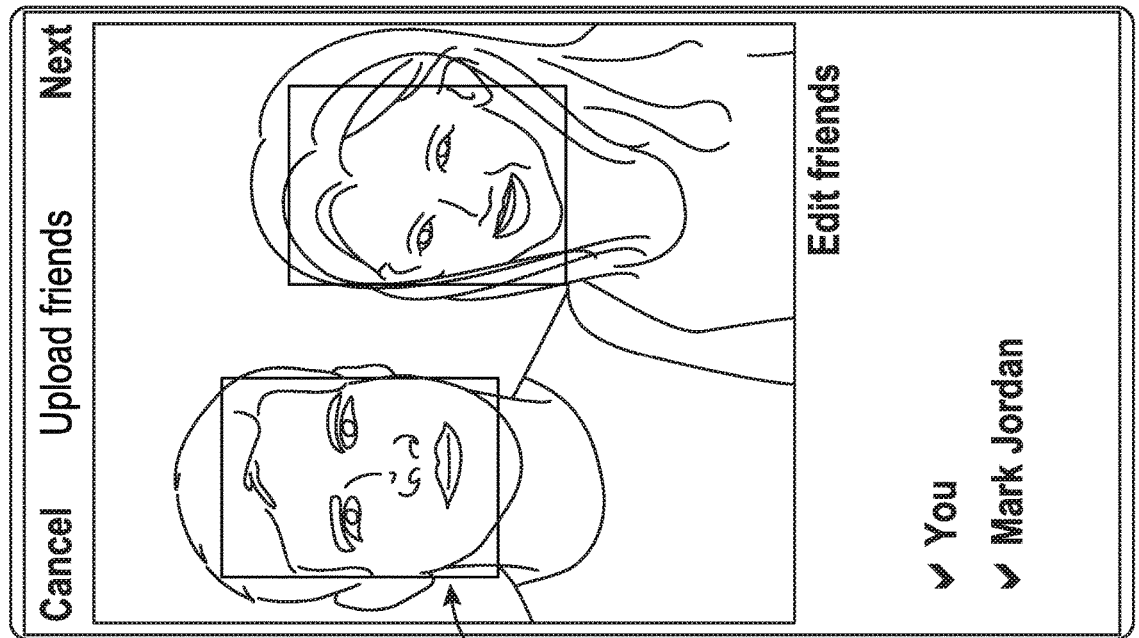
Figure 2B:
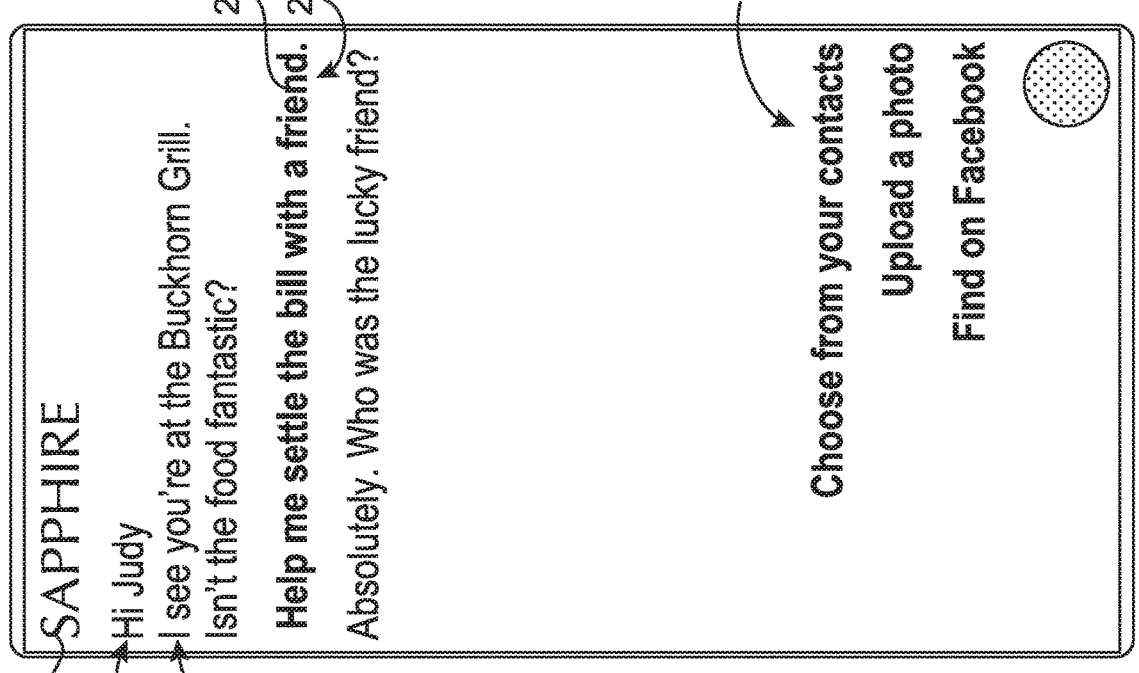

In the example shown in FIGS. 2A, 2B, the user may select a preset response 208 indicating that she will upload a photograph to identify the other person who will be splitting the bill from the restaurant. The user may then proceed to take a picture of her and her friend and upload the picture to the CardBot System through a CardBot API, for example. Alternatively, the user may use a previously saved photograph stored on her user computing device 600. The CardBot System may use facial recognition and/or biometric software known in the art to process and identify the persons in the photograph. In the example shown in FIG. 2B, the CardBot System recognizes and identifies the user Judy and her friend Mark. The user may then confirm the persons recognized by checking off the names listed on the display.

At block 106, the CardBot System may prompt the user for information 212 pertaining to the action to be taken 211. The information 212 pertaining to the action may include, for example, receipt data or stored transaction data. In the example shown in FIG. 2C, the CardBot System may ask the user for a receipt for the restaurant bill. The user may be provided with preset response options 208 such as taking a picture of the receipt or looking up the transaction from a list of saved transactions. The user, in the example shown in FIGS. 2C, 2D, may select the option of taking a picture of the receipt then may proceed with taking a picture of the receipt and uploading it to the CardBot System through a CardBot API. The CardBot API may then display the received receipt data 212 to the user, which may include an itemized listing of the food and beverage items purchased as well as the cost associated with each item.

At block 108, the CardBot System may ask the user for and receive parameters 214 through the CardBot API for the action to be taken 211. The parameters 214 may include how a transaction or bill is to be divided among the user and the other person(s). In the example shown in FIG. 2E, the parameter 214 may be in relation to how the restaurant bill will be split or divided between Judy and her friend Mark. For example, the CardBot System may inquiry if the bill will be split "50/50." The user may confirm the 50/50 split or may indicate that the bill will be split in some other fashion. For example, as shown in FIG. 2E, the user declines the 50/50 split (e.g., "No way, he drank more!") and may indicate that the bill will be divided in some other way.

At block 110, the CardBot System through the CardBot API may prompt a user for additional information 216 relating to the action to be taken, which may be entered by the user. For example, the CardBot System may facilitate the customized splitting of a bill or transaction by instructing the user to indicate which items the user and the other persons had alone and which items were shared and by whom. As shown in the example of FIG. 2E, the CardBot System may instruct the user to "[s]ingle tap" on items the user had alone and "double tap" on items that were shared. The user may then follow the instructions and single tap on those items she had alone and double tap on those items she shared. The CardBot System may provide a visual indication of the items that were consumed or purchased alone and which were shared. For example, in FIG. 2E, the user single taps on the items she had alone and double taps on the items that were shared. The items that were single or double tapped may be highlighted on the interface 602 of the computing device 600 to indicate that a selection has been made. For the items that were shared, a separate visual indicator may be provided so that it is clear to the user, which items she is indicating as shared items. For example, as shown in 2E, a solid dot may appear in front of the shared items that were double tapped by the user. The user may then indicate when she is finished selecting the items, for example, by tapping on a "Done" button.

The items with no highlighting may indicate the items that the user's friend Mark had alone. If more than one friend are involved in the transaction, additional visual indications may be presented to indicate which friend had which items alone, and which items were shared and by whom. For example, if the user Judy wants the split the bill Mark and another friend John, the CardBot System may prompt Judy to indicate the items that Mark and John had alone and provide some unique visual indication of such items. The CardBot System may also ask Judy if there were any items that Mark and John shared with each other and without Judy, and which items were shared by all three, Judy, Mark and John, and provide a unique visual indication of for these items so it is clear to the user how the bill is to be divided.

The CardBot System may also determine at a block 110 if the bill has already been paid by the user or one of the other person(s) involved in the action before performing the action to be taken. In the example shown in FIG. 2F the CardBot System may determine that the user's friend Mark has already paid the restaurant bill using his Chase Freedom® card and may provide this information to the user Judy, for example, on a display screen of the user computing device 600.

At block 112, the CardBot System may perform the action to be taken. The action to be taken may be based on the person(s) involved in the action 210 received at block 104, the information 212 about pertaining to the action to be taken inputted at block 106, the parameters 214 entered by the user at block 108, and the additional information 216 received at block 110.

Figure 2F:
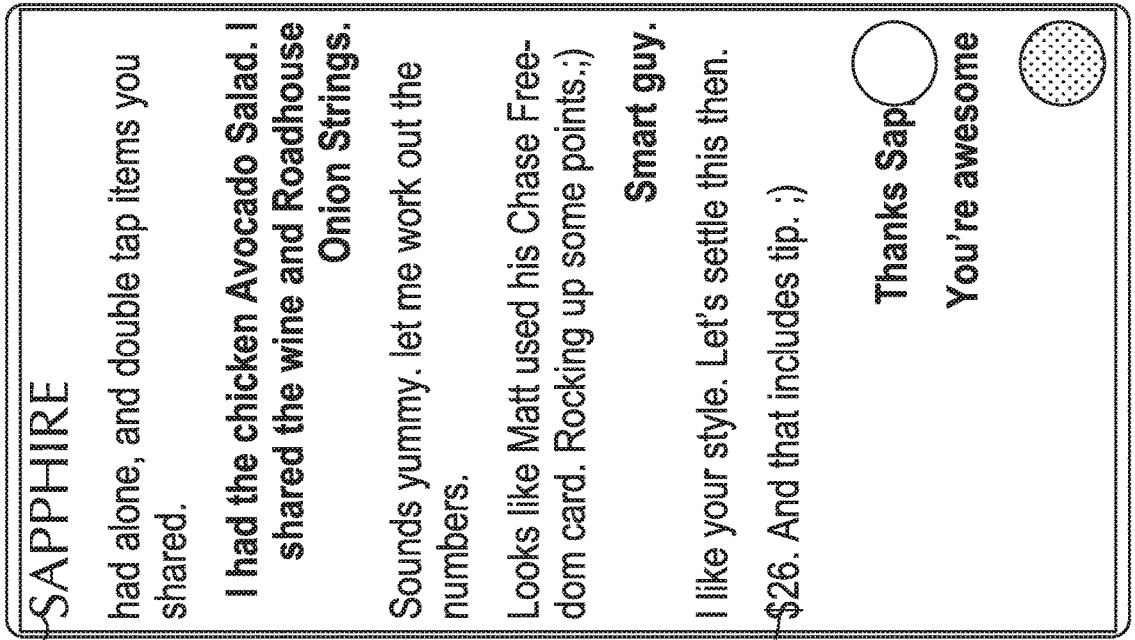
Figure 2E:
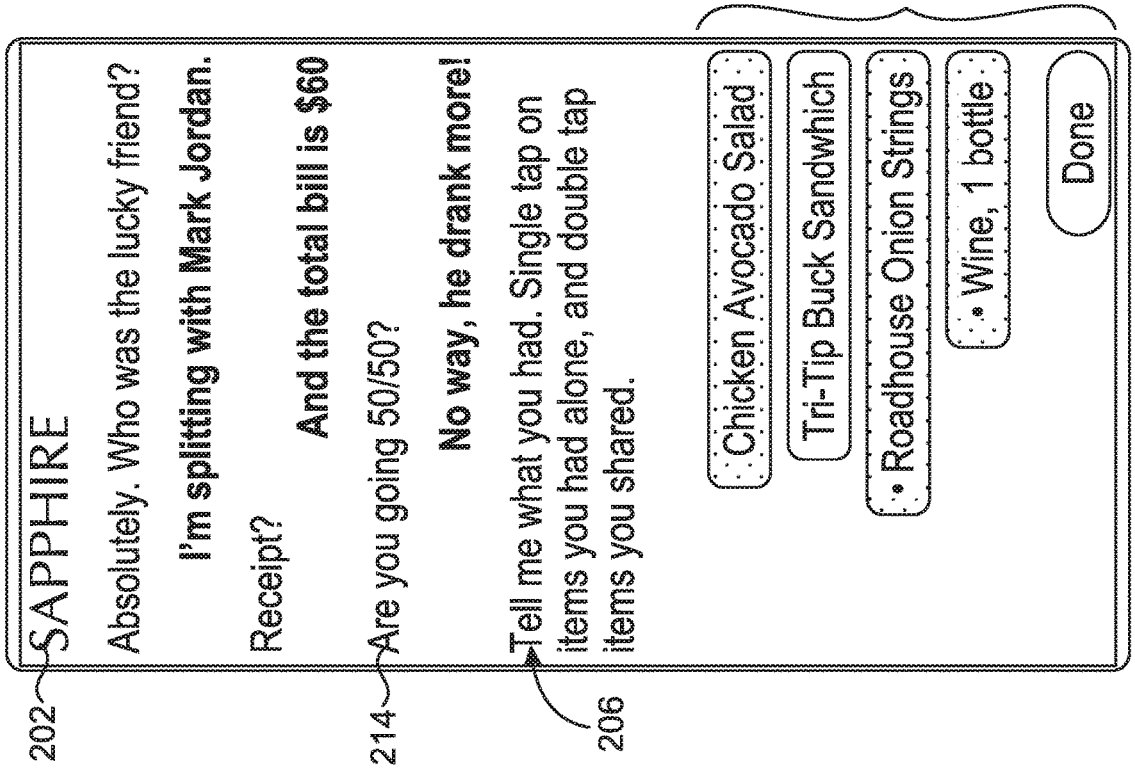

In the example shown in FIGS. 2E, 2F, the CardBot System may determine that the user's friend Mark has already paid the restaurant bill using his "Chase Freedom®" card. The CardBot System may then determine the amount Judy owes to Mark based on the information 212 pertaining to the action to be taken (i.e., the receipt inputted) at block 106, the parameters 214 (i.e., how the bill is to be divided) entered at block 108, and the additional information 216 (i.e., the items Judy had alone and those shared) entered at block 110, and provide the result of the calculation 217 to the user. As shown in the example of FIG. 2F, the CardBot System may calculate that Judy owes her friend mark $26.

At block 114, the CardBot System may facilitate the sending of payment from the user's payment account 202 to the payment accounts of the other person(s) involved in the transaction, the sending of payment from the other person(s) payment account to the user's payment account 202, and/or the sending of payment from the user's account 202 and/or the other person(s) involved directly to a merchant associated with the action to be taken. As shown in FIGS. 2A-H, to the CardBot System through the CardBot API may facilitate the sending of payment from a payment account associated with the user's Sapphire® transaction card to her friend's Mark account as Mark had already paid for the restaurant bill with his Chase Freedom® card.

At block 116, to the CardBot System may determine whether a reward 218 associated with the action to be taken is available to the user. The reward 218 may be offered by the merchant associated with the action to be taken, an issuer of the transaction card used in the action to be taken, or some other third party. If no reward is available, the method ends.

If a reward is available, to the CardBot System at block 118 may provide a visual indication 220 to the user that a reward 218 has been or can be earned. The visual indication 220 may or may not provide the actual amount of the reward 218. For example, in FIG. 2G, to the CardBot System may indicate that a reward 218 is available to the user Judy by displaying a gemstone or other image or icon on a display of the user computing device 600. The CardBot System may provide one or more reward offers that the user can choose from. For example in FIG. 2G, a "Small Gem," "Med. Gem," and "Super Gem" may be displayed which represent different reward offers.

The CardBot System may or may not reveal the actual value of the reward 218 with the display of the visual indication 220. Rather, the CardBot System may indicate at milestone 222 that must be achieved in order to reveal or "unveil" the actual value of the reward. For example, in FIG. 2G, the CardBot System may indicate that to unveil the Small Gem reward the user must make "3 purchases" at the merchant, to unveil the Med. Gem reward the user must make "5 purchases," and to unveil the Super Gem reward the user must make "10 purchases" at the merchant. By presenting the rewards as visual indications (e.g., gemstones) and concealing the actual value of the reward until certain milestones are reached, the CardBot System makes earning a reward interactive and game-like.

Figure 2H:
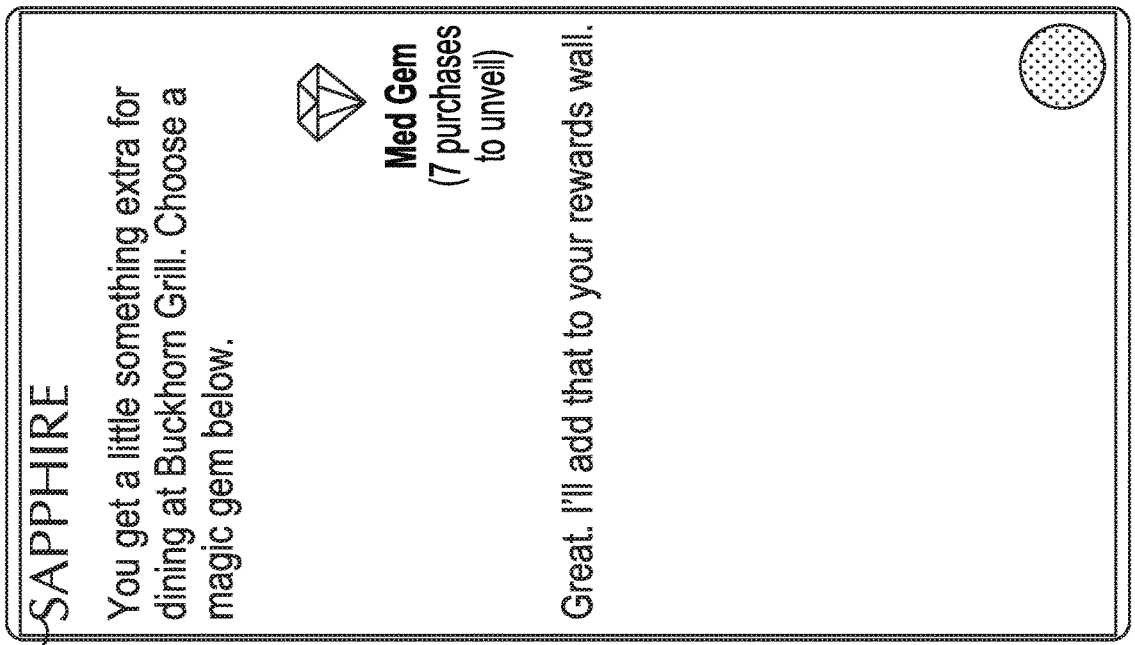
Figure 2G:
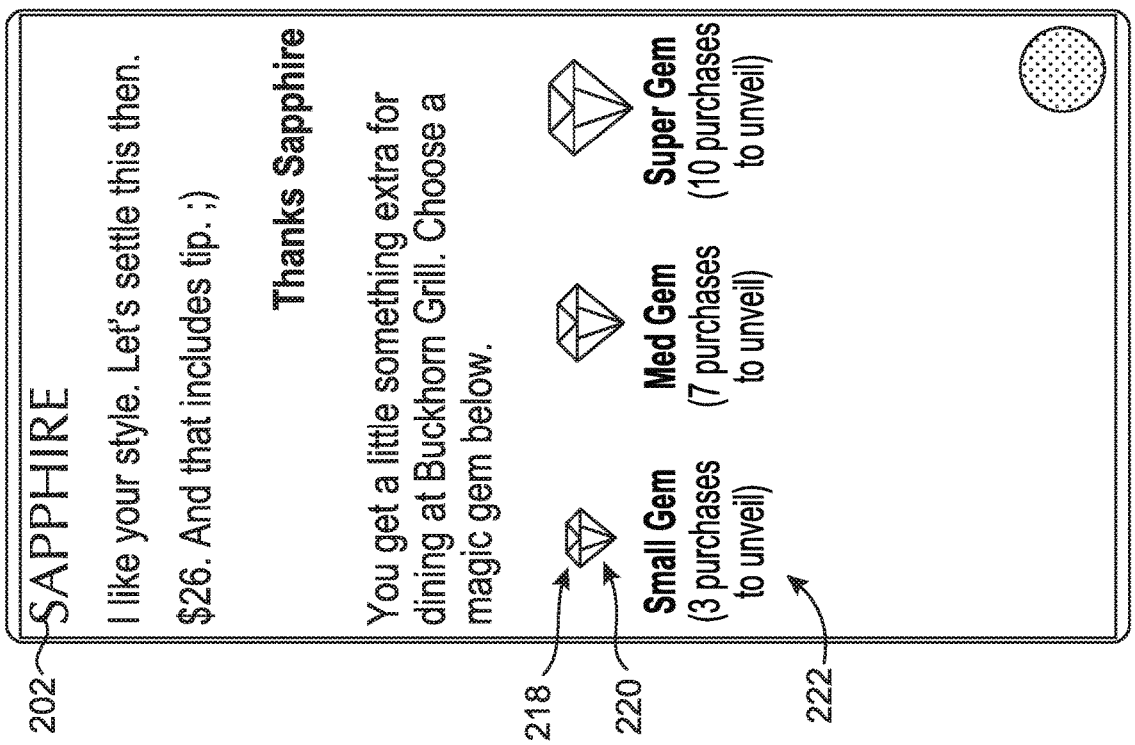

At block 120, the user may select the reward 218. The user may select the reward based on her current or anticipated future purchases, but the actual value of the reward may not be displayed or made known to the user until the user reaches the milestone associated with the offered reward. As shown in FIG. 2H, the user Judy selected the Med Gem reward, which requires 7 purchases at the Buckhorn Grill in order for the actual value of the reward to be revealed.

At block 122, the CardBot System may confirm the addition of the reward 218 to the user's CardBot account and store the reward 218 and any associated milestone in a memory 710 or 715 of the CardBot System. In addition, the CardBot System may keep track of the user's progress toward reaching the milestone. With respect to the example shown in FIGS. 2A-2H, the CardBot System may store the Med. Gem reward for the Buckhorn Grill and the 7 purchase milestone in the memory of the CardBot System. The CardBot System may keep track of the user's purchases at the Buckhorn Grill and may provide an indication that the user has met the milestone upon the user's seventh purchase at the Buckhorn Grill. As discussed in more detail below, the CardBot System may unveil the actual value of the reward 218 to the user once the reward 218 becomes available (e.g., after the milestone is reached) and upon the user's selection of the available reward for redemption.

The method 100 may end, may return to any of the preceding steps, and/or repeat one or more times.

Figure 3:
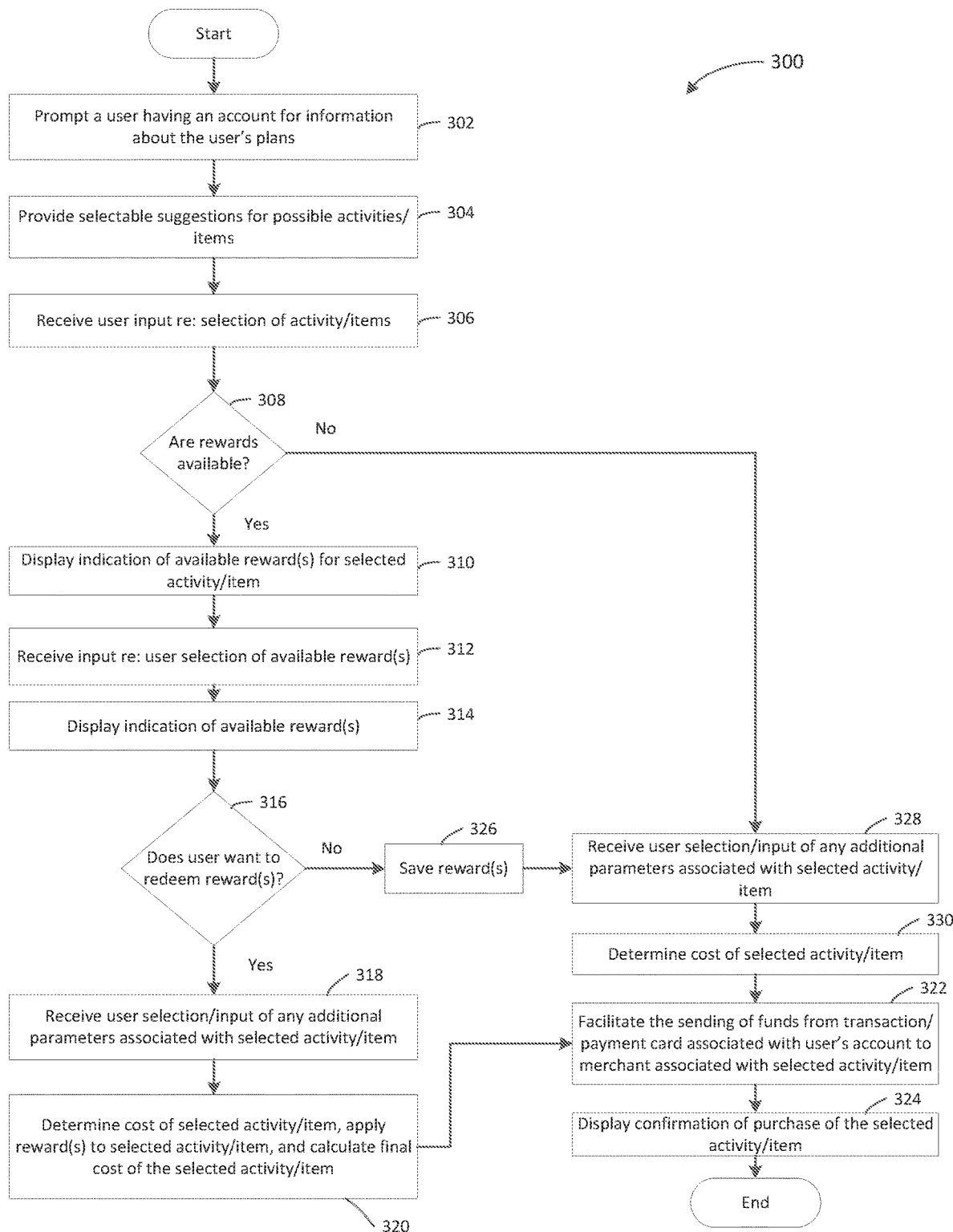
FIG. 3 illustrates an exemplary method for redeeming and using rewards in the CardBot System.

FIG. 3 illustrates an embodiment of a method 300 for redeeming and using rewards using the CardBot System. As noted above, a user may register any number of user payment accounts 402 with the CardBot System using the CardBot API, for example. At block 302, the CardBot System may provide a personalized greeting 404 to the user and may provide a customized message 406. The customized message 406 may be based on the location of the user determined by the CardBot System through the use of geolocation software, on the current date, on the day of the week, the time of day, or any other variable. The customized message 406 may provide information to the user, confirm the location of the user or other information, or may present an inquiry to the user. The CardBot System may provide the personalized greeting 404 and customized message 406 to prompt a user for information about their upcoming activities or purchases. The CardBot System may then wait for a response 408 from the user.

The response 408 may be preset by the CardBot System or may be entered by the user using the input interface 602 of the user computing device 600. The responses 208 may provide information to the CardBot System through the CardBot API or may request the action to be taken 211 (e.g., the settling of a bill).

Once the response 408 is received, the CardBot System may provide selectable suggestions 430 as to possible activities or suggestions as to items to purchase, at block 304. The suggestions 430 for possible activities may be based on the response received from the user at block 302. The suggestions may be based on past activities purchased by the user or on activities that are popular near the location of the user. The activity suggestions may also be based on activities that are popular on a particular day. For example, going to a fireworks display on the Fourth of July or going to the movies on a rainy day. The CardBot System suggestions 430 for items to purchase may be those that the user has recently viewed online, items of interest to the user that are now on sale, items of interest to the user that are available at a nearby store, or items that are commonly purchased at or near the location of the user (e.g., deep dish pizza if the user is in Chicago).

Figure 4B:
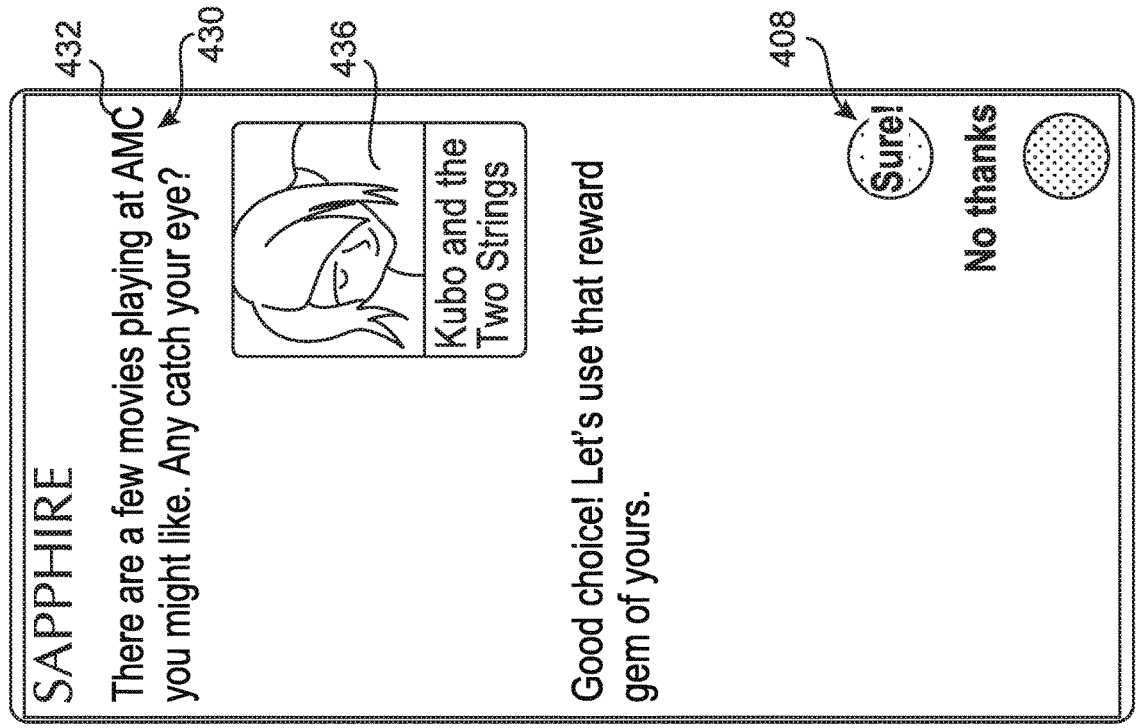
FIGS. 4A-H show as example of the CardBot System assisting with the use and redemption of rewards.
Figure 4A:
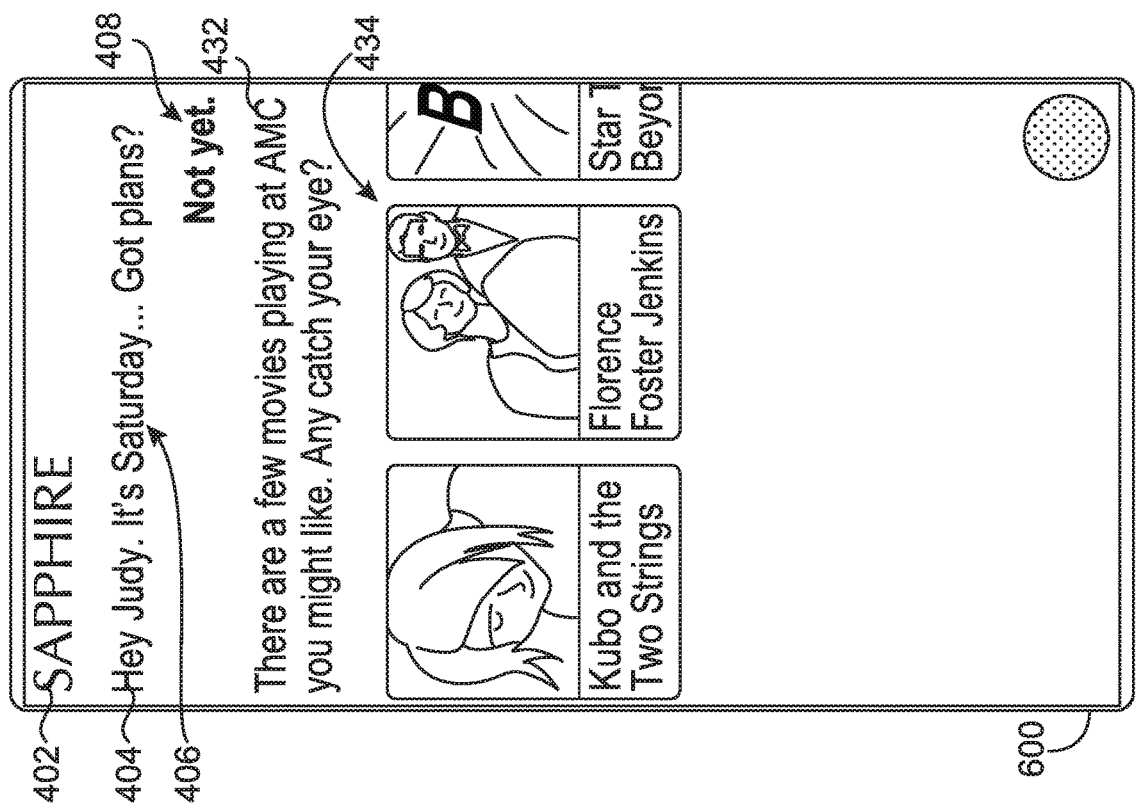

For example, as shown in FIGS. 4A-H, the CardBot System through, for example, the CardBot API may send a greeting 404 and a customized message 206 to the user Judy asking her if she has plans for Saturday. The user may provide a response 208, in which the user states that she does not have any plans. The CardBot System may then provide a suggestion 430 for an activity, for example, going to a theater to watch a movie as shown in FIG. 4A.

The CardBot System may also provide a vendor or list of vendors 432 for the activity and any additional information 434 about the activity. For example, in FIG. 4A, the CardBot System may indicate that the AMC theater 432 is offering a variety of movies and the CardBot System may provide a list of movies 434 that are currently being shown at the AMC movie theater. The vendor(s) provided to the user may be based on the location of the user. For example, the vendor(s) may be selected based on whether their geographic location falls within a certain radius (e.g., 5 miles) of the user. The radius may be preset by the CardBot System or the user. The vendor(s) provided for selection may also be based on the user's past history or selected preferences. For example, if the user has indicated that she only goes to AMC theaters, the CardBot System may only present AMC theater locations. Or, if the user has a history of going to a certain vendor, e.g. AMC theaters, more than any other vendor, the CardBot System may list locations for the frequented vendor (e.g., AMC theater locations) before other vendor locations. Also, the suggested vendor(s) may be based on the existence of a reward that the user is presently earning or has earned. For example, if the user is working to obtain a reward for a vendor by meeting a milestone (e.g., 3 purchases to each a small reward), the CardBot System may list the vendor associated with the reward and indicate that the user needs "X" more purchases to meet the milestone.

Similarly, if the CardBot System provides a suggestion 430 as to an item to be purchased. The CardBot System may provide a merchant or list of merchants 432 where the item is available. The merchant may be an online store or a bricks and mortar store. The suggested merchants may be based on a geographic location of the merchant to the user, a user's preference, a user's purchase history, or on a reward associated with the merchant.

At block 306, the user makes a selection of the suggested activity or items for purchase 430 and the vendor or merchant 432, if a selection of a vendor or merchant is required, that is presented by the CardBot System t. For example, as shown in FIG. 4B, the user selected the movie "Kubo and the Two Strings."

At block 308, the CardBot System may determine if the user has any rewards available for redemption 438. If no rewards are available or the user does not wish to view the available rewards, then the method may proceed to a block 328 discussed in more detail below.

Figure 4C:
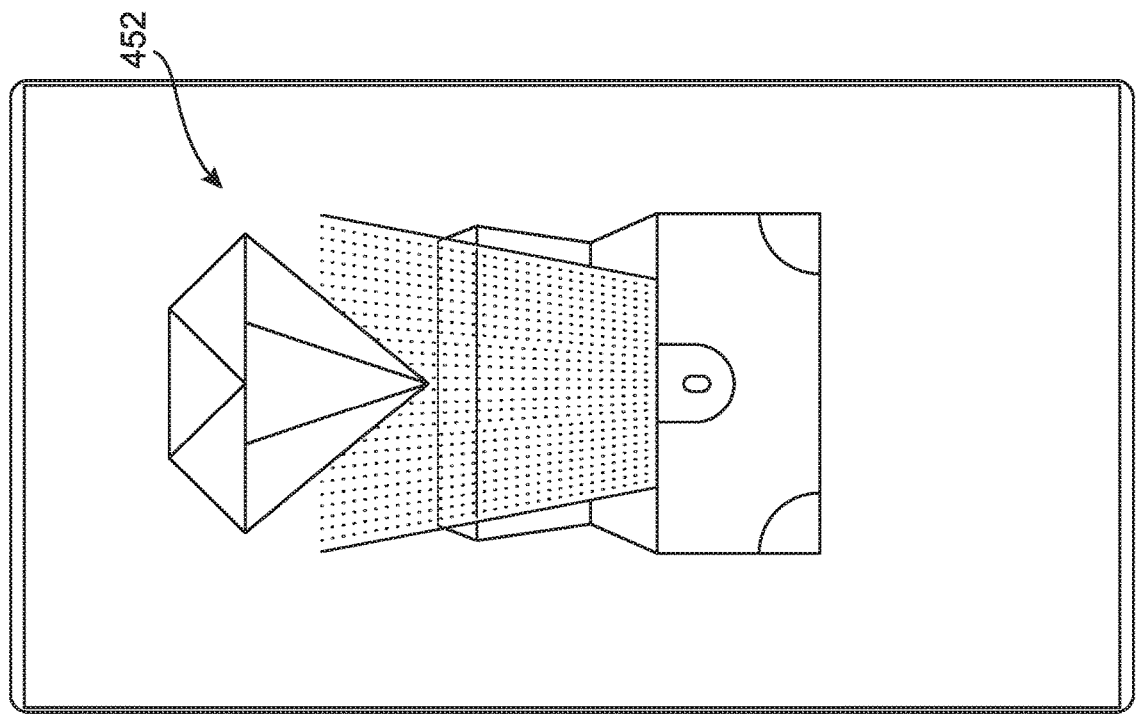
Figure 4D:
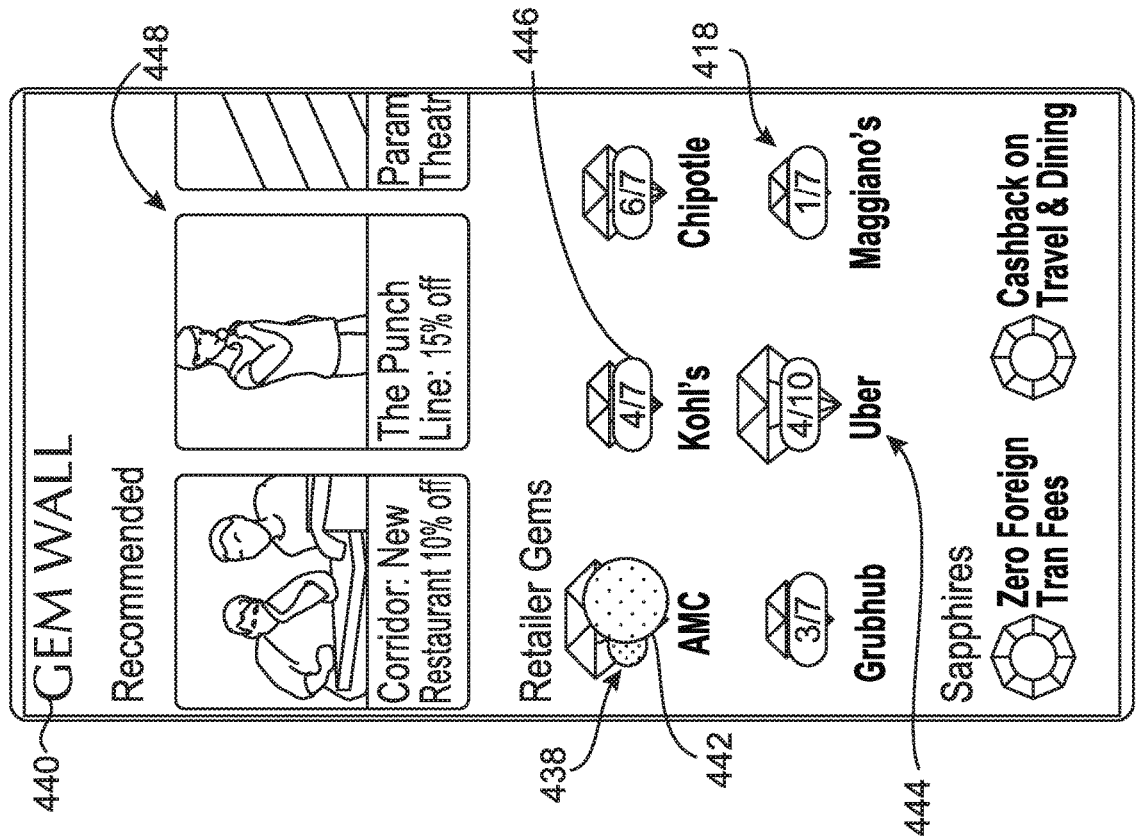

If rewards are available for redemption and the user wishes to view them, the CardBot System at block 310 may display the reward available for redemption 438 to the user. The reward available for redemption 438 may be displayed on a rewards wall (e.g., "Gem Wall") 440 for the user that is generated by the CardBot System. The rewards wall 440 may include both rewards that are available for redemption 438 and rewards that are currently being earned 418 and are not yet available for redemption. The rewards available for redemption 438 and those being earned 418 may be displayed as an icon, image, or animation. As shown in FIG. 4C, the rewards being earned 418 and rewards available for redemption 438 may be represented as a gemstone icon on the rewards wall 440.

The rewards being earned 418 and rewards available for redemption 438 displayed on the rewards wall 440 may be those for the selected activity or the selected item 436, an item or activity related to the selected activity or item, or may simply be a listing of all rewards regardless of the relationship to the selected activity or item. As shown in the example in FIG. 4A-C, the selected activity 436 is going to see a movie at the AMC theater. The rewards wall 440 may display a reward for the AMC theater 442. The rewards wall 440 may also display rewards for activities or items related to going to the movies; for example, a reward 444 for an Uber ride. The rewards wall may also display items or activities unrelated to the selected activity; for example, a reward 446 for a Kohl's store. In addition to displaying rewards, the CardBot System may also provide offers and incentives 448 for additional activities and items on the rewards wall 440 or provide a list of past offers that are still available.

Figure 4F:
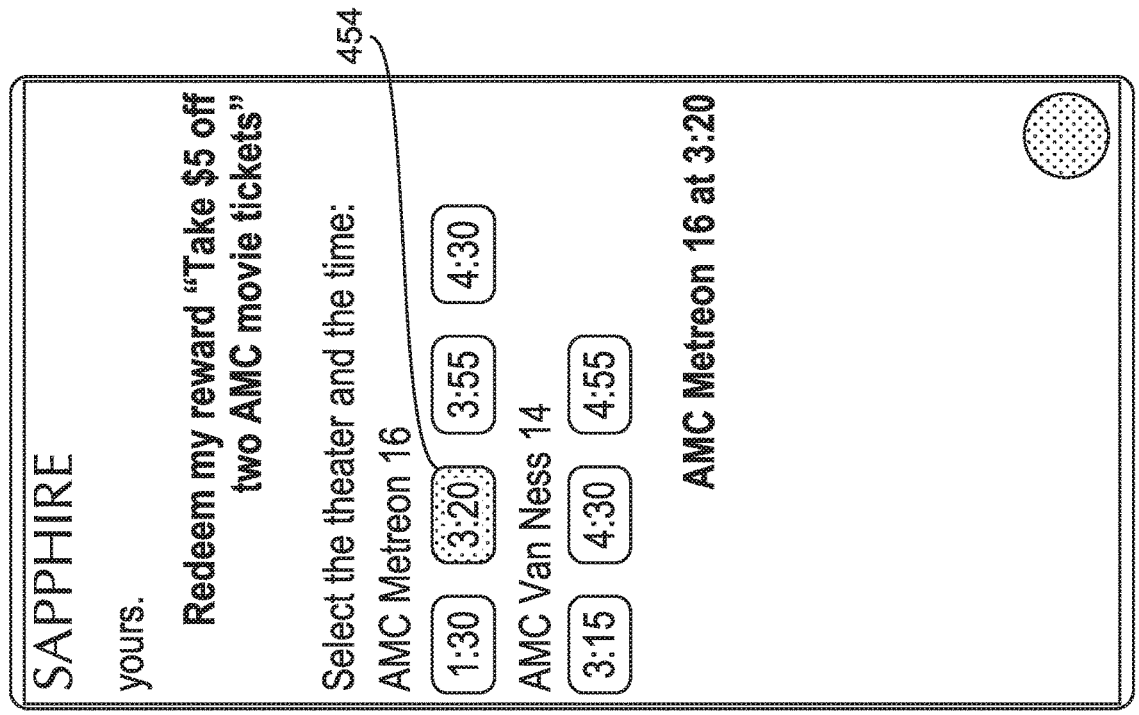
Figure 4E:
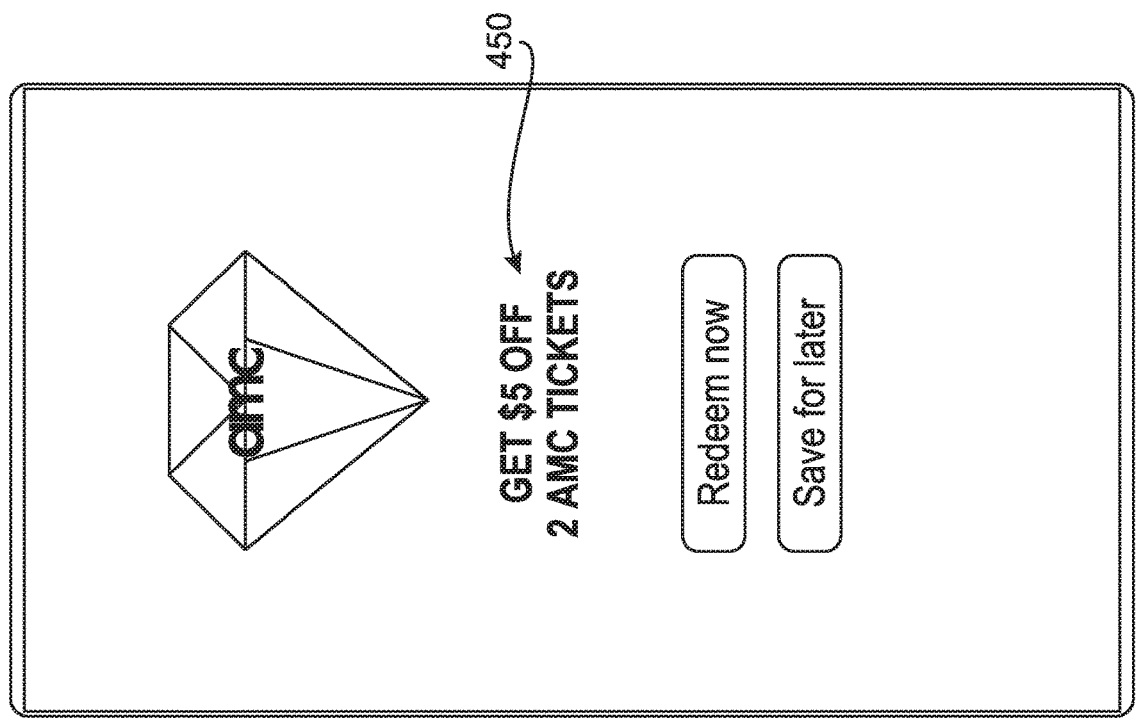
Figure 4H:
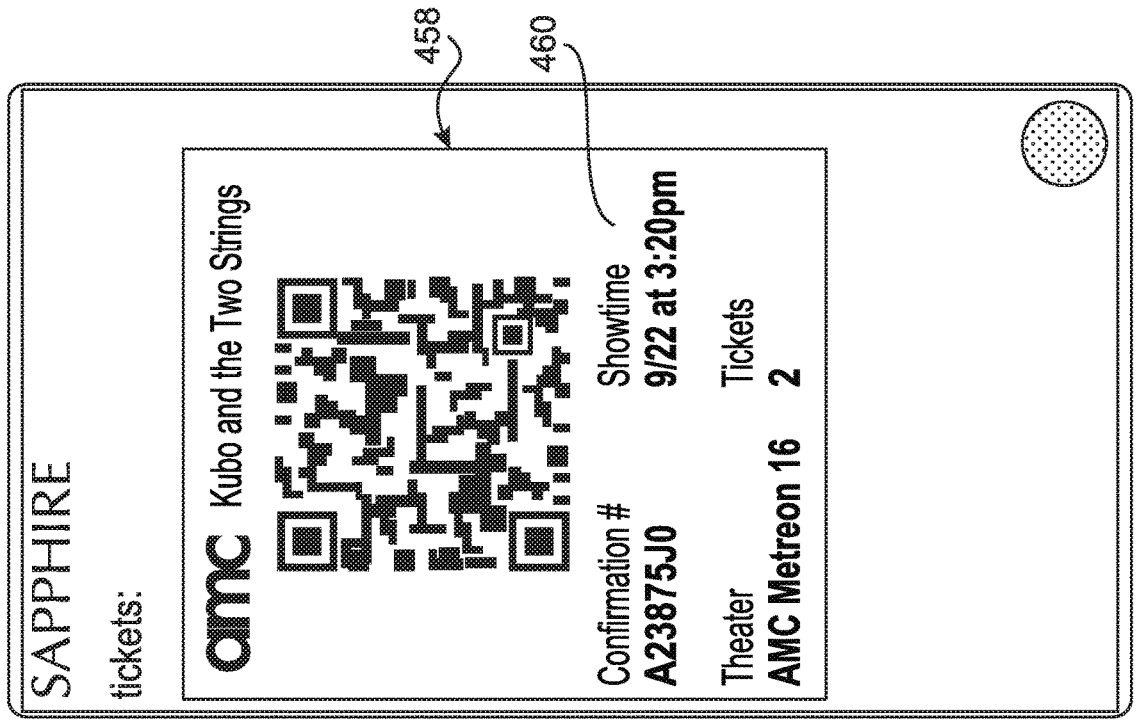

At block 312, the CardBot System may receive a user selection of one or more redeemable rewards 438. The CardBot System may then "unveil" the actual value 450 of the reward available for redemption 438 to the user at block 314. As shown in FIG. 4C, the user may select the reward available for the AMC theaters 442. The CardBot System may then unveil the actual value 450 of the reward available for redemption 438 to the user through an animation 452. For example, in FIG. 4D the reward available for the AMC theaters is unveiled using a treasure chest animation, in which the treasure chest is opened to reveal the actual value 450 of the selected reward gemstone. As shown in FIG. 4E, the actual value 450 of the selected reward is "$5 off of 2 AMC tickets."

Once the actual value 450 of the reward available for redemption 438 is unveiled, the user at a block 316 may be prompted as to whether it would like to redeem the actual value of the reward now or save it for later as shown in FIG. 4E.

If the user decided to redeem the actual value 450 of the reward now, the CardBot System may receive the user's input through the CardBot API, for example, at block 318. The user may then be prompted to select or input parameters 454 associated with the selected activity or item 436. The parameters 454 may be a specific location of the merchant offering the activity or item, or a specific time or time frame the user plans to do the activity or purchase the item. For example, as shown in FIG. 4F, the user may select the movie theater location and time at which she wishes to view the movie.

Figure 4G:
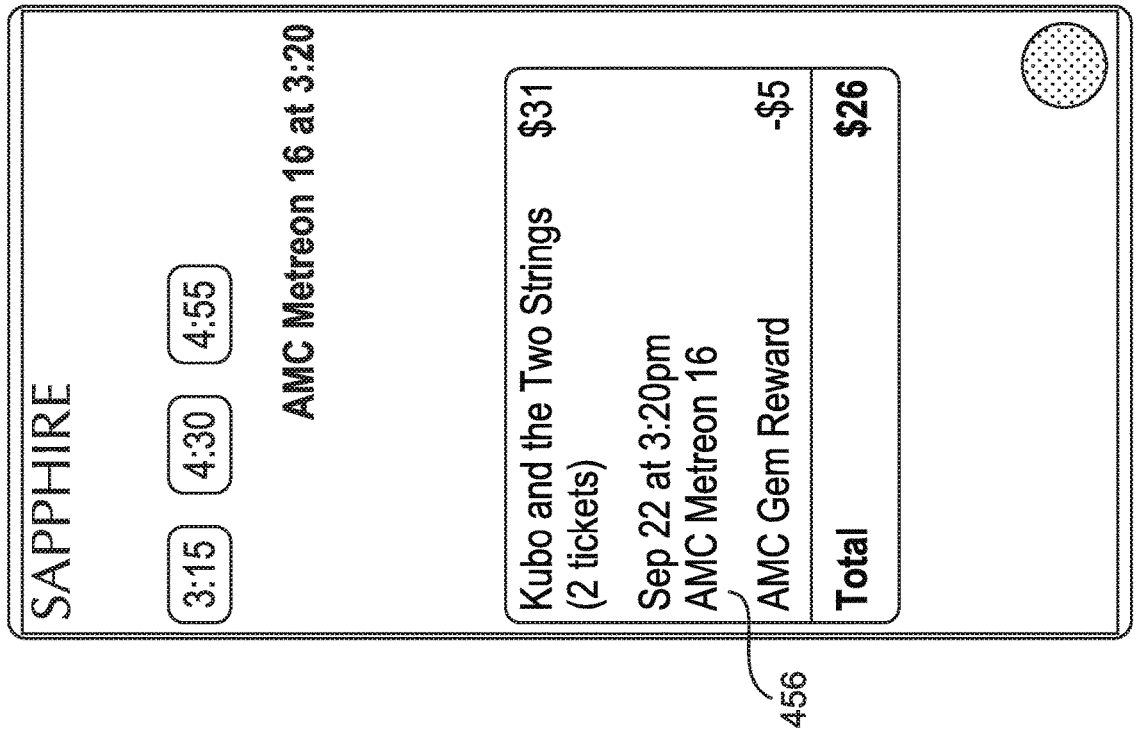

Once the additional parameters 454, if any, are selected, the CardBot System may determine the cost of the selected activity or item 436, apply the redeemed reward to the cost, and calculate the final cost of the selected activity with the applied reward at block 320. The calculation for the final cost of the selected activity/item 436 may be provided to the user via a display 456 on the interface of the user computing device 600. For example, as shown in FIG. 4G, the price of the movie tickets along with the applied reward and the final calculation are provided in the display 456 to the user.

At block 322, the CardBot System facilitates the sending of funds from the user's payment account 402 to the vendor or merchant 4 associated with the selected activity or item.

At block 324, the CardBot System may display a confirmation 458 of the selected activity or item and any additional information 460 relating to the selected activity or item. For example, in FIG. 4H, the CardBot System may display an electronic ticket for the purchased movie and includes the date and time of the movie as well as the theater selected and the number of seats purchased.

If the user decides at block 316 to save the actual value 450 of the redeemed reward for later use, the value of the reward is saved to the memory 710 or 715 of the CardBot System server at block 326 and the method proceeds to block 328.

At block 328, the CardBot System may prompt the user for any parameters 454 associated with the selected activity or item 436 and determine the cost of the selected activity/item at block 330. The cost of the selected activity/item 436 may be displayed to the user via the display 456. The method may then proceed to block 322 as discussed above.

The method 300 may end, may return to any of the preceding steps, and/or repeat one or more times. The methods 100 and 300 may be executed in tandem with each other, at the same time, or separately.

A sample API may be illustrated below. At a high level, the API may define what data to expect in specific places in a data packet such that a unified set of rules and expectations may be used to communicate the data between a central computing device and a portable computing device used by a user. In addition, the elements of the API may change based on a variety of factors such as the bandwidth available, the type of good or service currently being addressed, the action to be taken, etc. In some embodiments, the APIs may change based on the variety of factors. For example, there may be an API for services, an API for goods, an API for low bandwidth situations, an API for high bandwidth situations, etc.

Below is a sample API which may be used as part of a transaction as described in relation to FIG. 1. The API may be known by the user device and the CardBot server to ensure swift, accurate and efficient communication. In some embodiments, initial communications may be used to select the proper API. For example, the user's response 208 may be translated into one or two bits and may indicate a selection, which in turn, may indicate another API is required. The system, for example, may recognize that a response 208 that indicates that the bill should be split "50/50" may require a separate API to be followed than when a user makes a statement that a custom division of the bill is needed (e.g., "No way, he drank more!").

| | |
|---|---|
| ACTION [settle bill] | Bits 0-63 |
| PEOPLE [payors] | Bits 64-255 |
| DETAILS [receipt] | Bits 256-511 |
| PARAMETERS [divide rule] | Bits 512-1027 |
| ADDITIONAL [shared costs] | Bits 1028-1091 |
| ACTION [calculate] | Bits 1092-1155 |
| TRANSFER [settle bill] | Bits 1156-1219 |
| REWARDS [rewards available] | Bits 1220-1283 |
| REWARD DISPLAY [details] | Bits 1284-1347 |
| REWARD RESULT [balance] | Bits 1348-1412 |

Further, the API may be broken into sections such that the initial communication may follow a first API and the communication regarding REWARDS may be separate and may follow a separate API. Similarly, each section of the data packet may have a variable name and a variable type such that the data may be more easily stored and retrieved as needed.

Figure 5:
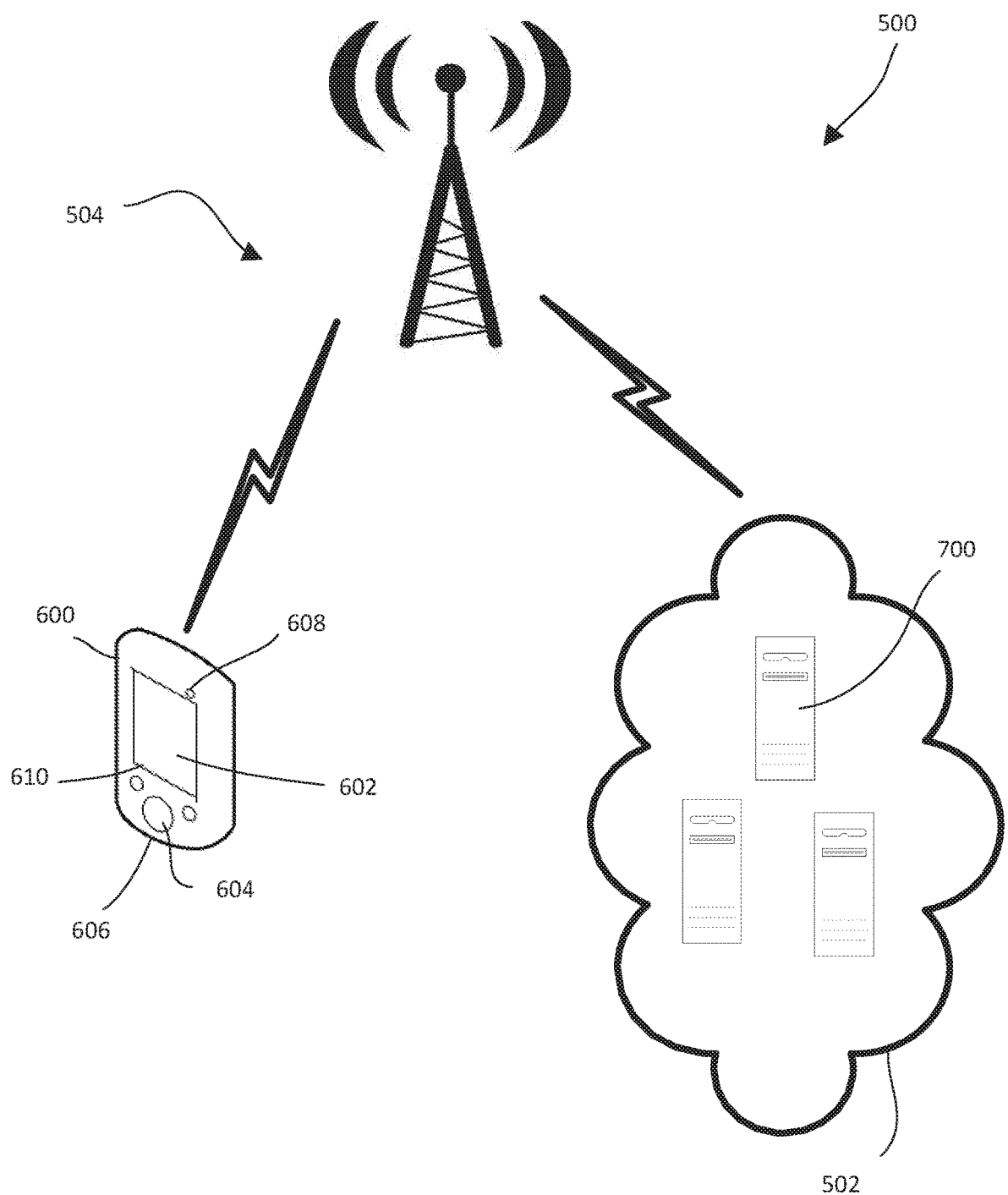
FIG. 5 is a high level illustration of a computing environment for the CardBot System.

FIG. 5 may be a high level illustration of some of the elements a sample computing environment 500 that may be physically configured to implement the various embodiments of the CardBot System, the related method and its logical variants. The user computing device 600 may store one or more chat platforms or payment/banking APIs upon which the CardBot System resides and is accessed.

The user computing device 600 may have an input interface 602, which may or may not be a touch sensitive display. More specifically, the input interface 602 may have a capacitance sensor, for example, that may be used to provide input data to the user computing device 600. In other embodiments, input pad 604 such as arrows, scroll wheels, keyboards, etc., may be used to provide inputs to the user computing device 600. In addition, the user computing device 600 may have a microphone 606 which may accept and store verbal data, a camera 608 to accept images and a speaker 610 to communicate sounds.

The user computing device 600 may be able to communicate with the CardBot System server 700 or a plurality of the CardBot System servers that make up the cloud of computing devices 600. The user computing device 600 may be able to communicate via a communication network 504 such as cellular service, through the Internet, a private network, etc., having a variety of communication channels. In some embodiments, the communication channels may be wired such as through an Ethernet cable, a USB cable or RJ6 cable. In other embodiments, the communication channels may be wireless such as through Wi-Fi (802.11 standard), Bluetooth, cellular communication or near field communication devices. The communication between the user computing device 600 and the CardBot System server 700 may be direct or through a wireless network, e.g., Bluetooth, etc.

Figure 6:
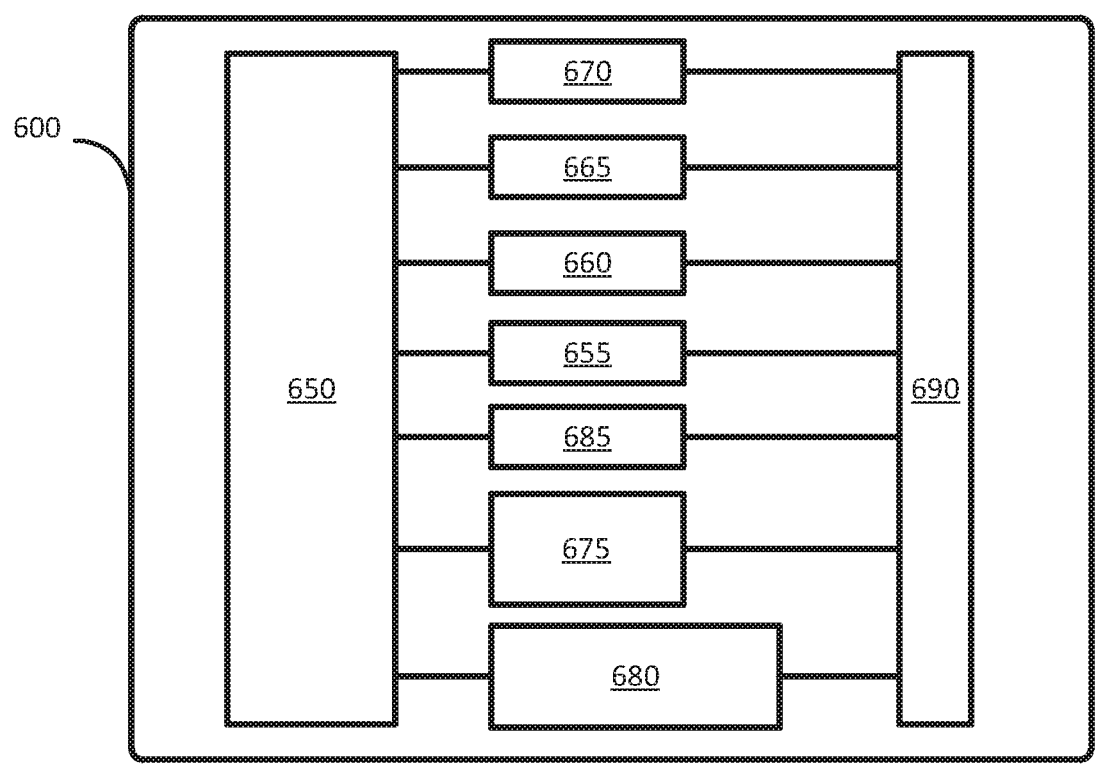
FIG. 6 is an illustration of a user computing device.

FIG. 6 may be a sample user computing device 600 that may be physically configured to interact with the CardBot System server. The user computing device 600 may have a processor 650 that is physically configured according to computer executable instructions. It may have a portable power supply 655 such as a battery which may be rechargeable. It may also have a sound and video module 660 which assists in displaying video and sound and may turn off when not in use to conserve power and battery life. The user computing device 600 may also have volatile memory 665 and non-volatile memory 670 as well as internal storage 675 or external storage 680. The user computing device 600 may have GPS capabilities 685 that may be a separate circuit or may be part of the processor 650. There also may be an input/output bus 690 that shuttles data to and from the various user input devices such as the microphone 606, the camera 608 and other inputs 602, etc. It also may control communicating with the networks, either through wireless or wired devices. Of course, this is just one embodiment of the user computing device 600 and the number and types of user computing devices 600 is limited only by the imagination.

Figure 7:
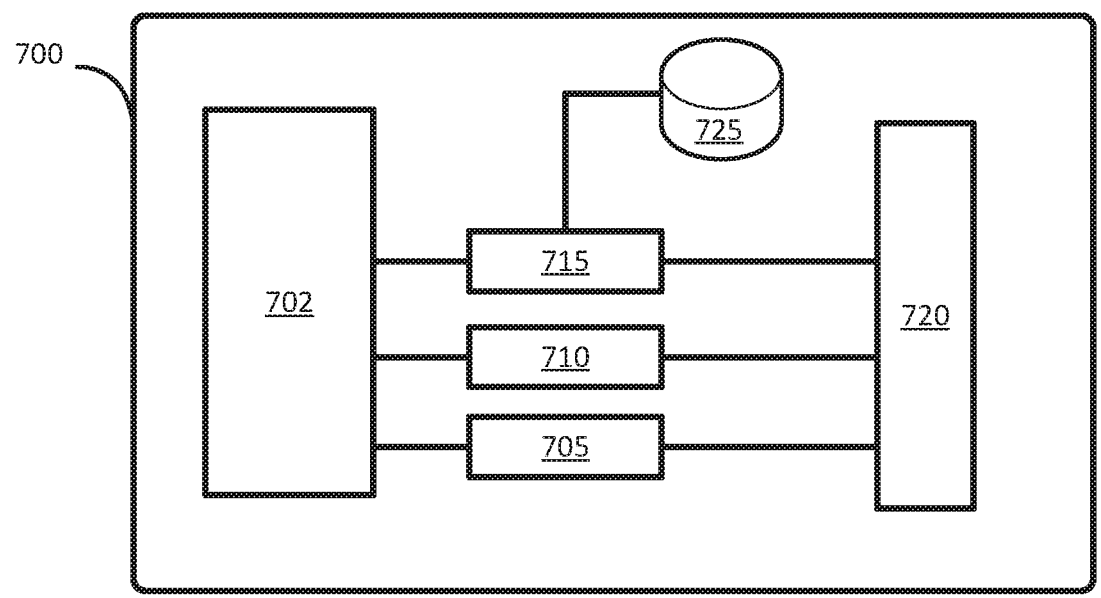
FIG. 7 is an illustration of a CardBot server that is part of the Cardbot System.

FIG. 7 may illustrate an example of the physical elements that make up the CardBot System server 700. Some of the physical elements may be located in other devices, depending on processing needs. The CardBot System server 700 may have a processor 702 that is physically configured according to computer executable instructions. It may also have a sound and video module 705 which assists in displaying video and sound and may turn off when not in use to conserve power and battery life. The CardBot System server 700 may also have volatile memory 710 and non-volatile memory 715.

In some examples, the CardBot System server 700 may include a digital storage such as a magnetic disk, an optical disk, flash storage, non-volatile storage, etc. Structured data may be stored in the digital storage such as in a database. A database 725 may be stored in the memory 710 or 715 or may be separate. The database 725 may also be part of a cloud and may be stored in a distributed manner. There also may be an input/output bus 720 that shuttles data to and from the various user input devices such as microphones, the cameras, and inputs, etc. The input/output bus 720 also may control of communicating with the networks, either through wireless or wired devices. Of course, this is just one embodiment of the CardBot System server 700 and the number and types of the CardBot System servers 700 is limited only by the imagination.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The user computing devices, computers, and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user computing devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user computing devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described figures, including any servers, point of sale terminals, user computing devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow diagram, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for facilitating group and peer to peer payments as well as the redemption and use of rewards earned by a user. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed is:

1. A computer-implemented method of assisting with payment of a transaction involving a plurality of users, the method comprising the steps of:
   receiving, via a processor, a request from a user computing device to settle the transaction between the plurality of users, wherein each user in the plurality of users is associated with a payment account;
   receiving, via the processor, a photograph of the plurality of users, wherein the photograph is taken using a camera of the user computer device;
   identifying, via the processor, each user in the photograph of the plurality of users and their associated payment account using facial recognition;
   receiving, via the processor, information pertaining to the transaction, wherein the information includes receipt data for the transaction;
   receiving, via the processor, indicia of how the transaction is to be settled between the plurality of users, and wherein the indicia are received via a display interface of the user computing device;
   calculating, via the processor, one or more amounts to be paid by at least one user in the plurality of users; and
   facilitating, via the processor, the sending of the one or more amounts to be paid from the payment account associated with the at least one user in the plurality of users to a merchant.

2. The computer-implemented method of claim 1, wherein the transaction involves a purchase of at least one item or at least one activity, the method further comprising the step of:
   receiving additional information pertaining to the transaction,
   wherein the additional information is an indication that the at least one item or the at least one activity was shared by the plurality of users.

3. The computer-implemented method of claim 1, wherein the transaction involves a purchase of at least one item or at least one activity, the method further comprising the step of:
   receiving additional information pertaining to the transaction,
   wherein the additional information is an indication that the at least one item or the at least one activity was consumed by only the at least one user in the plurality of users.

4. The computer-implemented method of claim 1, wherein the transaction was conducted at a merchant, further comprising the steps of:
   determining whether a reward is being offered to the at least one user in the plurality of users from the merchant; and
   providing a visual indication of the reward to the at least one user, wherein the visual indication of the reward does not provide the actual value of the reward.

5. The computer-implemented method of claim 4, wherein the visual indication of the reward includes a milestone, wherein the milestone must be met before the actual value of the reward is revealed.

6. The computer-implemented method of claim 5, wherein the milestone is met when a minimum number of transactions at the merchant are made using the payment account associated with the at least one user.

7. The computer-implemented method of claim 1, wherein the transaction was conducted at a merchant, further comprising the steps of:
   determining whether rewards are being offered to at least one user from the merchant, wherein the rewards include a first reward and a second reward; and
   providing a visual indication of the rewards to the at least one user, wherein the visual indication of the rewards does not provide the actual value of the rewards, and wherein the visual indication of the first reward is different from the visual indication for the second reward.

8. The computer-implemented method of claim 7, further comprising the steps of:
   receiving a selection of one of the first reward and the second reward by the at least one user; and,
   saving the selected reward to a rewards wall associated with the first payment account of the at least one user.

9. The computer-implemented method of claim 8, wherein the selected reward has an actual value and the actual value is not revealed to the at least one user until a milestone associated with the selected reward is met, further comprising the step of:
   providing an indication that the selected reward is available for redemption at the merchant upon completion of the milestone.

10. A system for assisting with payment of a transaction involving a plurality of users comprising a processor being physically configured to:
    receive a request from a user computing device to settle the transaction between the plurality of users, wherein each user in the plurality of users is associated with a payment account;
    receive a photograph of the plurality of users, wherein the photograph is taken using a camera of the user computer device;
    identify each user in the photograph of the plurality of users and their associated payment account using facial recognition;
    receive from the user computing device information pertaining to the transaction, wherein the information includes receipt data for the transaction;
    receive indicia of how the transaction is to be settled between the plurality of users, and wherein the indicia are received via a display interface of the computing device;
    calculate one or more amounts to be paid by the at least one user in the plurality of users; and
    facilitate the sending of one or more amounts to be paid from the payment account associated with the at least one user to a merchant.

11. The system of claim 10, wherein the transaction is for a purchase of an item or activity.

12. The system of claim 10, wherein the receipt data is obtained from a photograph of a receipt that is received via the user computing device.

13. The system of claim 10, wherein the indicia of how the transaction is to be settled is an indication that the transaction is to be split equally between the plurality of users.

* * * * *